United States Patent [19]

Edwards et al.

[11] Patent Number: 5,734,230
[45] Date of Patent: Mar. 31, 1998

[54] FAIL-SAFE LIGHTING SYSTEM WITH LOAD SHEDDING AND DIMMING

[75] Inventors: M. Larry Edwards; Mark A. Brown, both of Woodward, Okla.; Allan A. Nostwick, Huntington, Ind.; Roland O. Hildebrand, Euless, Tex.

[73] Assignees: Continuum Corporation; Harold Levine

[21] Appl. No.: 827,330

[22] Filed: Mar. 26, 1997

Related U.S. Application Data

[63] Continuation of Ser. No. 456,854, Jun. 1, 1995, abandoned.

[51] Int. Cl.$^6$ ................................................ H02J 9/00
[52] U.S. Cl. ............................ 315/86; 315/87; 307/66
[58] Field of Search ............................ 315/119, 86, 87, 315/160, 161, 175; 307/46, 66, 8

[56] References Cited

U.S. PATENT DOCUMENTS

| | | | |
|---|---|---|---|
| 3,387,141 | 6/1968 | Howald | 307/49 |
| 3,684,891 | 8/1972 | Sieron | 307/66 |
| 3,771,012 | 11/1973 | Niederjohn | 315/86 |
| 3,842,249 | 10/1974 | Geyer et al. | 235/151.21 |
| 4,075,504 | 2/1978 | Gnaedinger | 307/66 |
| 4,216,384 | 8/1980 | Hurley | 307/37 |
| 4,345,162 | 8/1982 | Hammer et al. | 307/39 |
| 4,575,679 | 3/1986 | Chung et al. | 324/427 |
| 5,037,089 | 8/1991 | Spagnuolo et al. | 272/134 |
| 5,057,697 | 10/1991 | Hammond et al. | 307/66 |
| 5,357,170 | 10/1994 | Luchaco et al. | 315/159 |

*Primary Examiner*—Robert Pascal
*Assistant Examiner*—David Vu
*Attorney, Agent, or Firm*—Harold Levine, P.C.

[57] ABSTRACT

A fail-safe lighting system which includes provision for setting priorities or sequences of operation for different lights or sets of lights. When normal power is interrupted, all or a selected number of lights remain lit and/or are dimmed, thus providing a first level of illumination during a predetermined period of time. However, when a selected interval of time has elapsed and the level of charge remaining on the battery or batteries which supply power during the interruption decreases, preselected one or ones of the lights are progressively dimmed or disconnected from the battery acccording to a predetermined schedule. Thus, the time during which one or more extremely critical lights remain lit can be substantially extended without depleting the charge on the battery.

49 Claims, 8 Drawing Sheets

FAIL-SAFE LIGHTING SYSTEM WITH LOAD SHEDDING AND DIMMING

This application is a continuation of application Ser. No. 08/456,854, filed Jun. 1, 1995, now abandoned.

This invention relates to lighting systems and more particularly to fail-safe systems with an extended time of emergency lighting for critical lights.

BACKGROUND OF THE INVENTION

Emergency fail-safe lighting systems have heretofore been proposed, illustrative of which are those shown and described in co-pending U.S. patent application Ser. No. 08/063,359 filed by M. Larry Edwards and W. Joe Watson on May 17, 1993. In accordance with such prior proposals, one or more lights or banks of lights are controlled selectively such that when in a fail-safe emergency mode, the light(s) continue to be energized for a substantial period of time after normal sources of electric power are interrupted. According to the foregoing proposal, a battery is continuously connected to one or more light ballasts such that as alternating current from a commercial source is supplied and rectified, the battery alternately receives and supplies current during each cycle thus retaining its charge so long as power is being received from the mains. When power from the mains is interrupted, the battery continues to supply power to the lights thus maintaining their luminescence without the necessity for switching.

Other proposals have been made for switching between power from commercial sources and the like to battery power for lighting systems during power outages. Still other proposals have been made for dividing loads into those that are essential and those that are non-essential; then discontinuing supply to the non-essential loads under certain circumstances. An example of the latter is set forth in U.S. Pat. No. 4,575,679 granted to Chung et al. Mar. 11, 1986. According to the proposals of that patent, a system is proposed for ensuring provision of critical power in a spacecraft by dividing the loads into those that are interruptible and those that are not. A method is provided for simulating the charge condition of a battery and for controllably disconnecting the interruptible loads when the system determines that such disconnection is needed to avoid discharging the batter to a danger level.

The time during which lights can be lit from batteries is finite and sometimes insufficient to fulfill the needs of the system, and in others, the characteristics of the batteries are such that it is damaging to discharge the batteries below a threshold level significantly above that of complete discharge. Moreover, in some areas there are ordinances or other statutory requirements that all or some of the lights remain lit for prescribed periods of time. In other installations, statutory or functional requirements may be satisfied by a combination of dimming and selective disconnection.

Although in many instances, the time duration of a commercial power outage is relatively small and the charge on the battery therefore does not decrease below a threshold level, in some outages the duration may exceed that for which initial lighting can be continued unchanged without damaging of depleting the battery. Accordingly, there has been a continued need for systems in which all or selected lights are initially energized during a first predetermined time interval following which, if the outage continues, critical ones of the lights remain fully energized or dimmed while others are effectively disconnected or dimmed sequentially so as to preserve and extend battery discharge time.

BRIEF SUMMARY OF THE INVENTION

The improved system according to the invention hereof includes monitoring circuits effective when normal sources of power are interrupted for monitoring charge remaining on the lighting power supply battery. With passage of time while in the emergency mode, the battery charge decreases, and when a plurality of lights are included in the system, provision is made for a variety of modes of operation including: selectively switching off and/or dimming selected lights or groups of lights at predetermined points in the discharge of the battery, thus permitting progressive extinguishing and/or dimming of lights according to a priority schedule and ensuring continued supply of power to critical lights for periods beyond the capability of the battery if all originally lit lights were continuously energized at undimmed levels.

In an another embodiment, provision is made for programmable and individual control of lights from one or more central locations while preserving the features mentioned above.

OBJECTS AND FEATURES OF THE INVENTION

It is one general object of the invention to improve emergency lighting systems.

It is another object of the invention to facilitate selection of lights for emergency lighting.

It is yet another object of the invention to provide for selection of lights for continued lighting according to a schedule of priority.

It is still another object of the invention to extend the time during which selected critical lights can be energized by the lighting system fail-safe battery.

Accordingly, in accordance with one feature of the invention, a priority schedule for retaining selective energization of a plurality of lights is provided, thus establishing a predetermined order for extinguishing lights with the passage of time and level of battery discharge during power outages.

In accordance with an optional feature of the invention, a schedule for dimming and disconnection of selected ones of a plurality of lights is provided, thus enhancing versatility and selectability of individual lights within the system.

In accordance with another feature of the invention, sensing circuits are provided to monitor the charge on the emergency lighting system supply battery and to provide signals indicative thereof, thus facilitating controlled extinguishing and/or dimming of lights according to schedule.

In accordance with still another feature of the invention, the circuits are conditioned to respond to the signals representing the charge remaining on the battery by selectively interrupting and/or reducing flow of emergency current to light of lower priority while retaining current flow to lights of higher priority, thus providing for controlled and progressive turn-off and/or dimming of the lights according to the aforementioned schedule of priority.

In accordance with still another feature of the invention, provision is made to prevent extinction of selected lights until a predetermined time interval has expired, thus facilitating compliance.

These and other objects and features of the invention will be apparent from the following description, by way of example of a preferred embodiment, with reference to the drawing.

DESCRIPTION OF A PREFERRED EMBODIMENT

Figure 1:
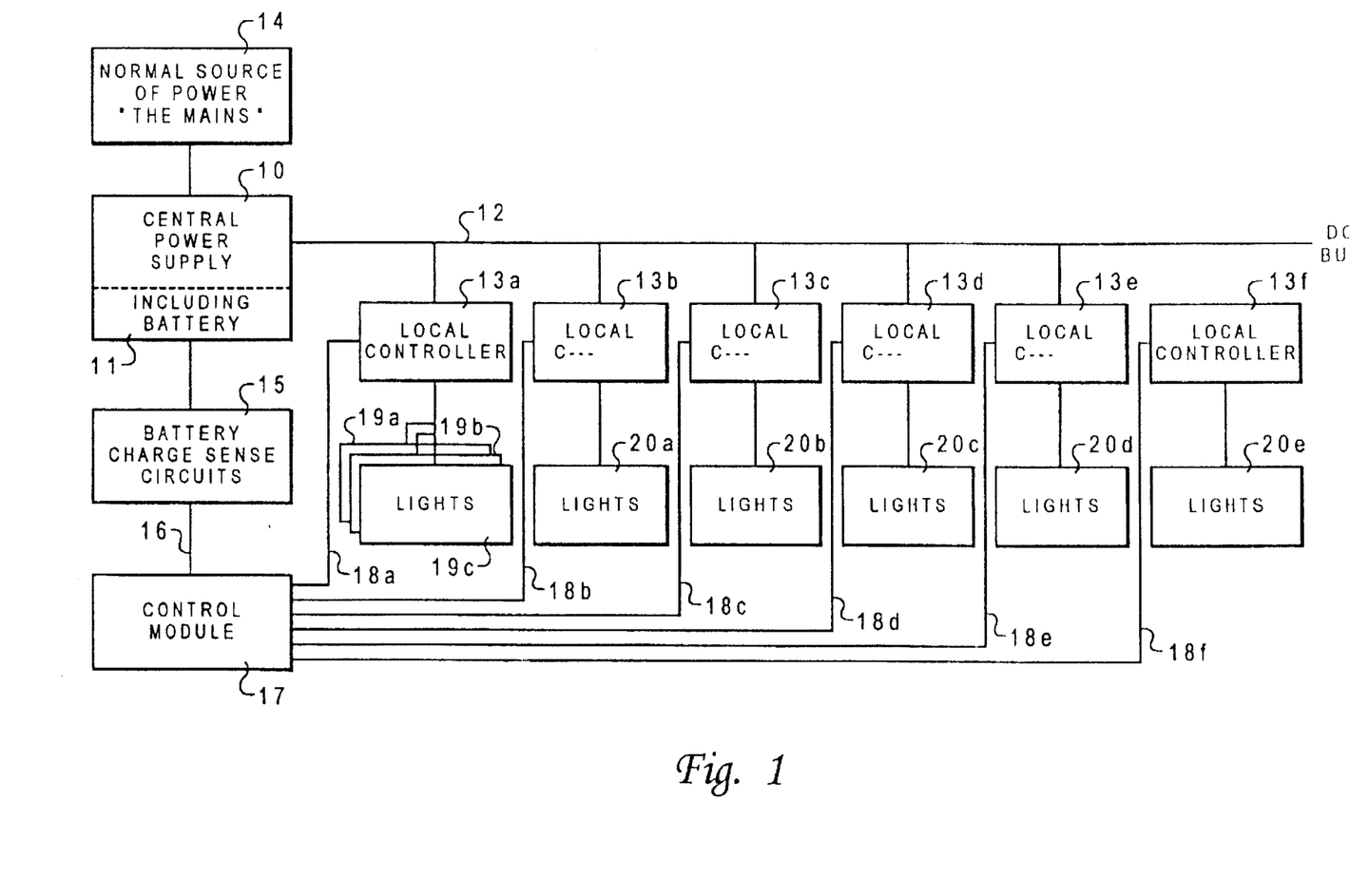
FIG. 1 is a block diagram illustrating implementation of progressive load-shedding according to the invention.

Now turning to the drawing, and more particularly FIG. 1 thereof, it will be seen to depict an emergency lighting system including a central power supply 10 having a battery 11 for supplying electric current via d-c bus 12 to a plurality of local controllers 13a–13f. For details of central power supply 10 and local controllers 13a–13f, reference is made to co-pending U.S. patent applications Ser. Nos. 08/457,015 and 08/457,394 filed on even data herewith, the descriptions of which are herein incorporated by reference. Although in accordance with the preferred embodiment, the central power supply 10 and local controllers 13 are as described in those applications, it should be recognized that the certain of the principles of the instant invention transcend the particulars of those applications and are also applicable to other systems having a plurality of lights that are to be energized from a battery when an outage occurs in the normal source of power.

Under normal circumstances, power for energizing the lights and charging the battery is supplied from a commercial source, sometimes referred to as the mains 14. However, as described in the above-referenced application, when an outage (interruption) occurs in the normal source, power is supplied from a battery such as battery 11 to maintain the lights lit. If the outage duration is relatively short, the battery is able to continue to supply adequate power until normal power is restored, at which time the battery changes to a charging mode during which it is recharged to its fully charged condition.

Oftentimes, it is desirable but not necessary to keep all of a group of selected lights lit during an entire outage provided the outage is brief or momentary. Thus, if the source of power is usually dependable, if extended lighting of the lights is not critical, and if lighting turn-off can be tolerated after a period of time, it has been found practicable to maintain the lights lit until the charge on the battery has decreased to a low threshold level, at which time the battery is disconnected and the lights therefore tune off. According to this mode of operation, continued lighting of the lights (or one selected group of lights) is maintained until either normal power is restored or the remaining battery charge has declined to a level at which the lights (or one selected group of lights) are extinguished. Unfortunately, operation in such a mode requires provision of a battery of sufficient size and capacity to supply energy to the lights during whatever term of continued supply is acceptable for the environment in which the lights are employed.

In marked contrast with the foregoing mode of operation, the circuits of FIG. 1 operate to provide a succession of partial disconnects according to a predetermined priority for continued lighting. Effectively interconnected with battery 11 are battery charge sense circuits 15 which may be any of a variety of conventional circuits for monitoring the charge remaining on the battery during the range extending from full charge to a threshold below which the battery is unable to maintain one or more lights lit. Electrical indicia such as analog or digital signals are extended from circuits 15 as by path 16 to control module 17 from which control circuits 18a–f are severally extended to local controllers 13a–f, thereby providing for individual control of individual lights and groups of lights as represented by light group 19a–c and individual lights 20a–e.

As described in the above-referenced co-pending application, provision is included within control module 17 for establishing and selecting priorities for continued light illumination or dimming during power outages. Thus, provision is not only made for selective control during outages for individual lights such as those of 20a–e, but provision is also made for selective control of lights within a group of lights such as light group 19a–c. According to such provision, all of part of lights 19a–c may be selected for continued illumination or dimming at the outset of an outage, and selected one or ones of lights 19a–c may be selectively extinguished or dimmed at a predetermined point in battery discharge while leaving another one or ones of such group fully or dimly lit until a further point in battery discharge is reached, at which point another one or ones of such lights may be dimmed or extinguished. As an example, at the onset of an outage, all of the lights may be maintained in their lit condition until remaining battery charge reaches a first predetermined level, at which time selected lights e.g., lights 19a, 19b, 20b, 20d and 20e may continue to be lit while the remaining lights are dimmed or extinguished. Continuing with such example, as the battery continues to be discharged until it reaches another lower predetermined level, lights such as 19a and 20b may be extinguished leaving lit lights 19b, 20d and 20e. Thereafter, if the outage continues, battery discharge will reach another predetermined level at which, for example, lights 19b and 20d are extinguished leaving lit only light 20e. By practicing the principles of progressive disconnection in accordance with established priorities that are tailored to the particular environmental requirements wherein the lights are installed, provision is made for customizing the succession and timing of lighting retention/disconnection to reflect the particulars of the needs for continued lighting under emergency conditions.

It should be noted that although controls for local controllers 13a–13f is shown as emanating from control module 17, in certain embodiments the local controllers themselves may be individually conditioned or conditioned in groups to perform control functions as described below thus contributing to system versatility and flexibility.

Figure 2:
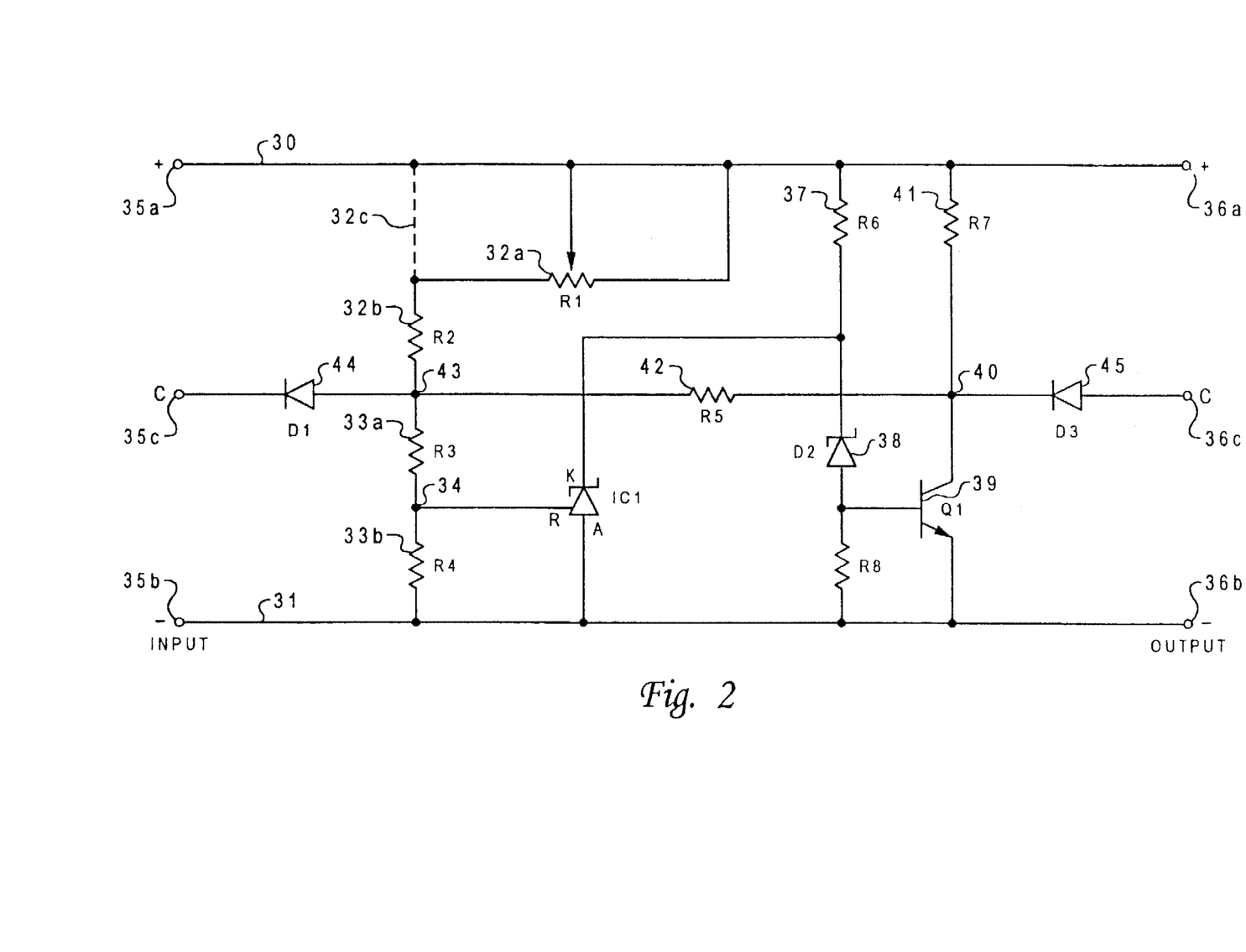
FIG. 2 is a schematic diagram illustrating a preferred circuit for sensing remaining battery charge and for producing selective light de-energization.

Now turning to FIG. 2 it will be observed that it is, as mentioned above, a schematic diagram illustrating preferred circuits of a load shedding module for sensing battery voltage levels indicative of remaining battery charge and for producing signals effective to produce selective light de-energization. As will be recalled from reference to the co-pending systems patent application mentioned above, one of the features of the system resides in its modular configuration which markedly simplifies field installation and individual selectability of features for tailoring features to needs of each individual installation. Accordingly, the circuits of FIG. 2 preferably are implemented within a module as represented in block diagram form in FIG. 3 and as described in connection with that figure and in connection with a corresponding figure in the co-pending systems application.

As is known to those skilled in the art, the voltage at the terminals of conventional batteries is indicative of the level of charge thereon. Thus, as a lead-acid battery discharges, its terminal voltage gradually declines. The circuits of FIG. 2 make use of this phenomenon by sensing the battery voltage and providing one or more battery disconnect and/or dimming signals when the battery voltage has declined to discrete predetermined levels. This is accomplished as is now described.

In the load shedding module of FIG. 2 there are seen positive bus 30 which is connected through a switched logic module (FIG. 3) to the battery positive terminal (not shown). In the preferred embodiment, the nominal terminal voltage of the battery is 24 volts, although it will be evident to those skilled in the art that a wide range of conventional voltage levels could be readily employed. Battery voltage exists between positive bus 30 and common, or negative, bus 31. Serially connected between positive and common busses 30 and 31 are a first pair of resistors 32a/32b and a second pair of resistors 33a/33b which are serially connected (as shown) to form a voltage divider to establish a voltage at point 34 which is less than the voltage between bus members 30 and 31 but proportional thereto. In one embodiment, variable resistor 32a makes it possible to adjust such proportionality and thus the point in battery discharge at which the circuits produce a load changing signal. In another embodiment, resistor 32a is eliminated and a connection is made between the upper terminal of resistor 32b and bus 30 as represented by dashed line 32a. In such event, it is contemplated that if operability at differing battery voltage levels is desired, several modules with correspondingly different fixed resistor ratios would be supplied so that the user could select the desired operating voltage level module for connection into the system.

Now considering operation of the module, the inputs 35a, 35b and 35c represent modular connection terminals for making connection with corresponding terminals on the switched logic module or switched logic receiver of FIG. 3; and output load timing/shedding terminals 36a, 36b and 36c represent modular connection terminals for making connection with corresponding terminals on a subsequent switched logic receiver or ballast also as shown in FIG. 3.

Controlled zener IC1 is a voltage regulating component that contains both a reference voltage source and an error amplifier. It functions by conducting a small current from its cathode terminal K to terminal A whenever the voltage difference between terminal R and terminal A is equal to or greater than the internal reference voltage level (e.g., 2.5 volts). As mentioned above, the voltage normally appearing at point 34 is proportional to the battery voltage. When the battery voltage is above a level at which activation of the module for light shedding or dimming is desired (e.g., the voltage at point 34 is at or greater than 2.5 volts), current flowing into terminal k causes the voltage drops across R6 resistor 37 and zener reference voltage diode 38 to be sufficient to bias the emitter-collector junction of Q1 transistor to its off or nonconducting state, whereupon the voltage at point 40 and output terminal 36c resides at a level of about one-half the battery voltage, a level which is recognized by the connected load controller so as to retain the load (e.g., lights) in an illuminated condition. However, when the battery bus voltage drops as the battery discharges, its level declines to a point at which the voltage at point 34 and input R to controlled voltage zener diode IC1 cuts off current flowing through IC1, at which time the voltage drop through R6 resistor 37 is reduced, the voltage on the base emitter junction of Q1 transistor 39 rises to turn Q1 on, and the current then flowing through R7 resistor 41 causes the voltage at point 40 and output terminal 36c to fall sharply so as to signal the connected load controller to change its state (e.g., turn the load, such as lights, off or to dim).

Further reference to FIG. 2 reveals the presence of a positive feedback loop to voltage reference input terminal R of controlled zener IC1. This loop includes R5 resistor 42 and R3 resistor 33a. Accordingly, when the voltage at point 40 is brought low, the voltage at junction 43 between R2 resistor 32b and R3 resistor 33a decreases, thereby further reducing the voltage appearing at control input R of IC1 and tending to retain it in its non-conducting condition. Thus, the turn on and turn off transition points of the circuit are separated by a small difference band such that there will not be a level of uncertainty where the output might fluctuate between on and off. In the absence of such feedback and the consequent provision of the difference band, when a load (e.g., light) turned off, the reduction in load on the battery would cause an increase of battery voltage to occur that might in turn cause the module output to transition back to its high state and possibly causing a continuing series of oscillatory-like changes from off to on and back off again.

Before turning to FIG. 3, it should be noted that the circuits provide for an effective pass through of control signals by virtue of the signal on 35c having the effect of lowering the voltage at point 43 and therefore on point 34, so that the circuit action is similar to that which occurs when the voltage on line 30 is reduced, and the output appearing on output terminal 36c also drops to its low state.

Now turning to FIG. 3, it will be seen to depict a block diagram illustrating the versatile and selective load control features of the system. There is illustrated a conventional source of energizing potential e.g., commercial alternating current power mains 50 connected to power module 51 via path 52a and to conventional wall switch 53 and switched logic module 54 via paths 52b and 52c. An additional path is extended between wall switch 53 and switched logic module 54 via path 55 so that module 54 can readily monitor the on-off condition of switch 53. As will be observed, the output of power module 51 is conducted to battery module 56 the output of which preferably supplied a direct current voltage of about +24 volts d.c. to positive bus conductor 57.

As will be evident from reference to the above-mentioned U.S. co-pending application, the preferred switched logic module 54 is provided with a plurality of outputs 58 which severally and selectively provide for control of any switched logic receiver to the selected one of the six available operating modes which are in addition to standard and test. If no connection is made to the control input of a ballast, the result is called "Standard Mode", in which the ballast runs continuously. In addition, activating separate inputs to the control switched logic module 54 can initiate what is called test mode in which a predetermined combination of output states is produced for system testing, or override mode for circumventing the normal programming that is wired into the system during unusual circumstances. The outputs 58 preferably are brought out to modular quick connect/ disconnect connectors so as to facilitate initial connection/ reconnection in the field when the equipment is installed.

Standard: represents a condition in which a load is continually energized (e.g., light on) with no load control in action and no operating control signal is connected to the load (e.g., light).

Mode 1 which is a Normal Mode in which the load (light) is controlled by a switch such as a wall switch. If the switch is on, the load will remain energized when mains power is lost. If the switch is off, the load (light) will be energized (light lit) when mains power is lost.

Mode 1A which is a Normal Mode with Override. Mode 1A is similar to Mode 1 except that in addition, the load can be turned on at any time by closing an override switch.

Mode 2 which is a Task Energizing (Lighting) Mode. This mode is similar to Mode 1 except that the load (light) is not automatically energized when mains power is lost. If the switch is on, the load (light) will remain energized during mains power failure; and if the switch is off, the load will remain de-energized (light off) during mains power failure.

Mode 2A which is a Task Energizing (Lighting) Mode with Override. This mode is similar to Mode 2 except that the load (light) can also be turned on at any time by closing an override switch.

Mode 3 which is a Standby Mode. According to this mode, the load (light) is normally off and will turn on when the mains power is lost. No switch inputs are accepted.

Mode 4 which is a Non-emergency Mode. According to this mode, the load (light) is controlled by a switch such as a wall switch. When the switch is closed, the load (light) will be energized but upon failure of mains power, the load will be permitted to become de-energized.

In addition to the foregoing Standard Mode and the six operating modes, there is also provided a Test Mode. According to this mode, closing of a test switch results in all control circuit outputs except for Mode 4 going high and thus calling for loads (lights) to be energized regardless of other control inputs.

Now returning to preferred switched logic module 54, it will be observed that connections representing the foregoing operating modes are identified by reference numerals 58. Moreover, selected individual connections thereto are represented by arrows 59a, 59a and 59c. However, it should be recalled that as described in the co-pending application, single or multiple connections may be made to all six of the selected operating mode output terminals or to only one if the functional requirements of the system so dictate.

Further reference to FIG. 3 reveals the presence of time delay module (TDM) 60 connected to switched logic receiver (SLR) 61. The purpose of TDM module 60 is to provide an optional time-out function to interrupt transmission of any module control signal that may otherwise be extended to SLR 61 via paths 62 and 63 until a predetermined interval of time has transpired following loss of mains power as represented by the output of Mode 3 and as extended via path 64 to TDM 60. Such optional time-out function may be desirable to comply with requirements (such as municipal ordinances) for preventing reduction of light intensity during an initial predetermined period of time following a power outage.

Figure 3A:
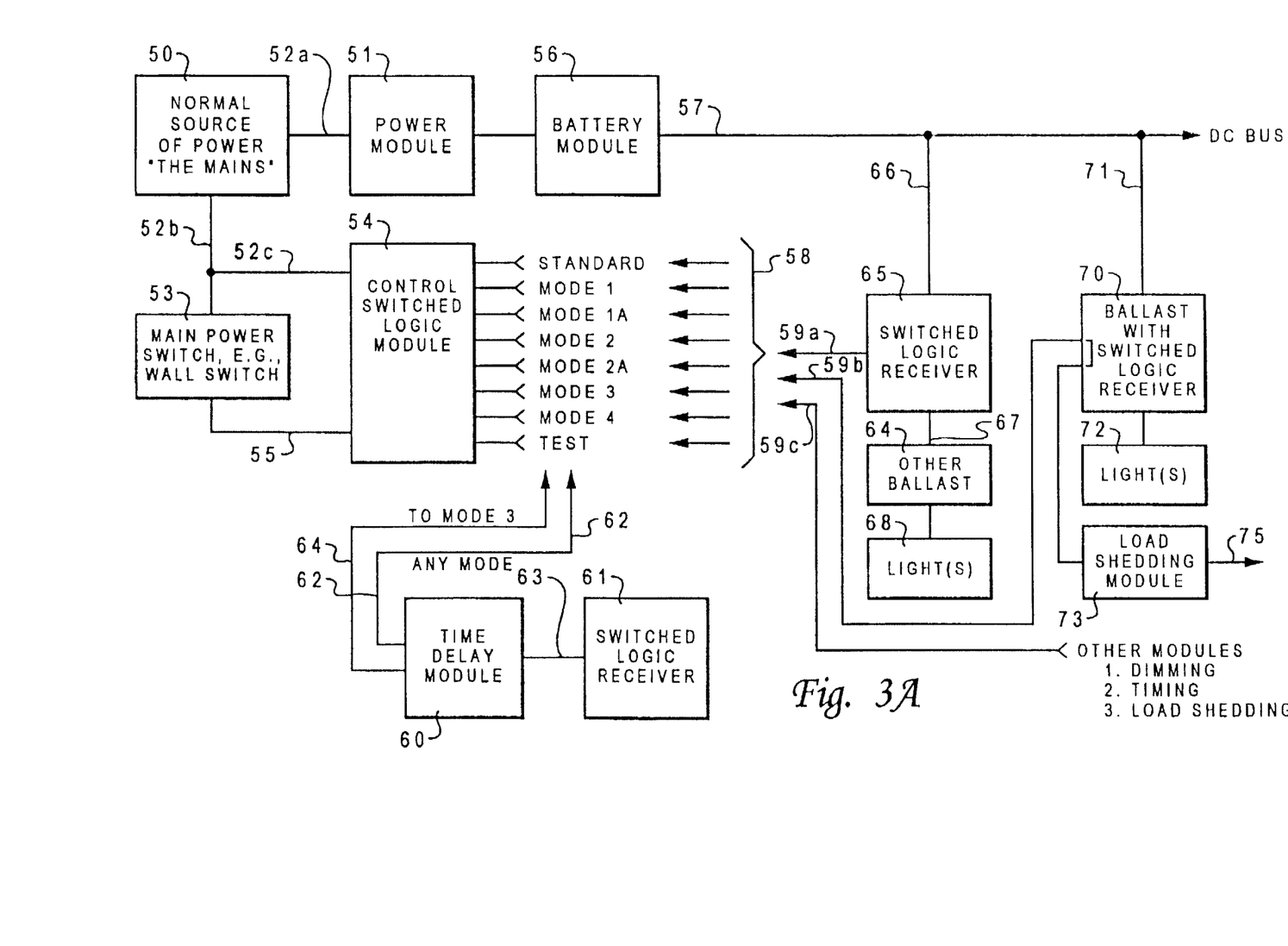
FIG. 3A and 3B together comprise a composite block diagram illustrating load control features of the system and jointly are hereinafter referred to as FIG. 3.
Figure 3B:
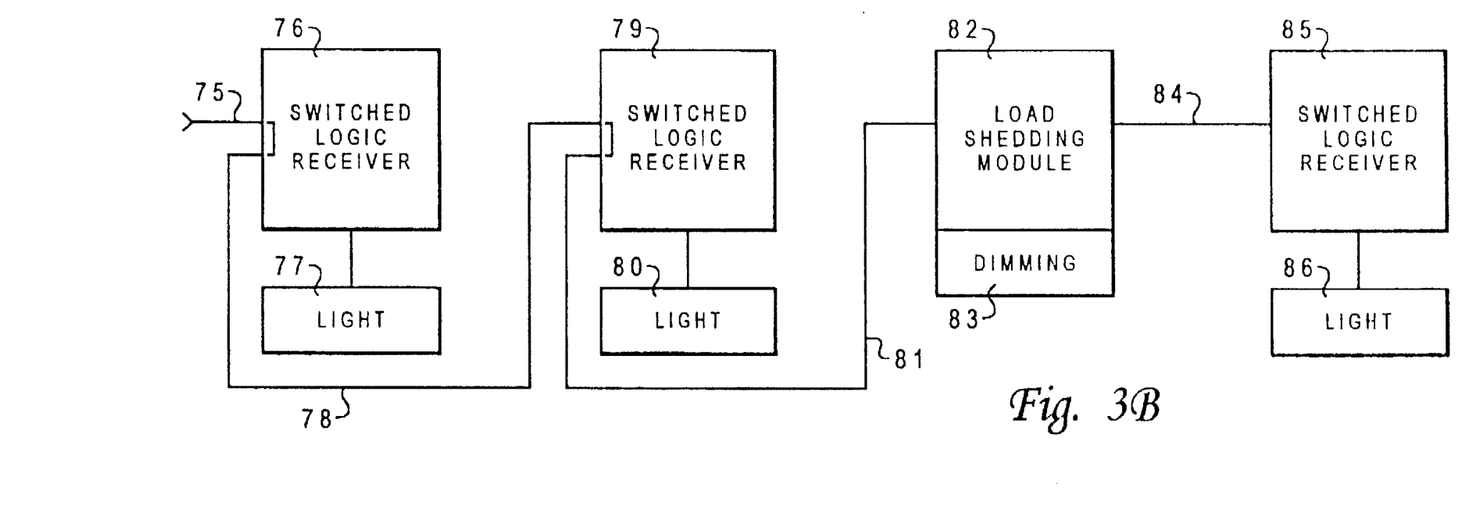

Further reference to FIG. 3 additionally reveals application of the principles hereof to lighting ballasts such as those described in the above-mentioned companion application. As will be recalled from that application, one embodiment of the switched logic receiver is adapted for controlling conventional lighting ballasts (e.g., Other Ballast 64 in FIG. 3A); and such is represented by SLR 65 which controls transfer of energy from positive bus conductor 57 via paths 66 and 67 to conventional ballast 64. As will also be observed, terminal 59a is connectable to any one of the six control mode terminals 58 so as to correspondingly condition SLR 65 to control the load (e.g., other ballast 64 and connected lights 68) according to the selected mode.

As also will be recalled from the above-described co-pending application, a second embodiment of the switched logic receiver is combined with a lighting ballast into one module that is adapted for directly controlling conventional lights without the necessity for providing a separate ballast. In FIG. 3, such is identified by rectangle 70 that includes the legend "Ballast with Switched Logic Receiver." As with Ballast 64, Ballast module 70 controls transfer of energy from positive bus conductor 57 via path 71 to light 72. As is the case with terminal 59a, terminal 59b is also connectable to any one of the six control mode terminals 58 so as to correspondingly condition SLR/Ballast module 70 to control the load (e.g., connected light 72) according to the selected mode.

As described in the aforementioned co-pending application, the switched logic receivers include provision for extending the electrical control signals (indicative of the selected one of the six operating modes) received from the transmitting module, i.e., the switched logic module such as module 54. Such extended signals are available for use in conditional other modules such as the load shedding module of FIG. 2 which is illustrated in block 73 of FIG. 3. Thus, when battery voltage appearing on bus 57 is greater than the above-described predetermined value, a control signal received from module 70 via path 74 is passed through module 73 via path 75 to switched logic receiver 76. Also represented by paths 74 and 75 are battery voltages that are conducted therethrough.

As described above in connection with FIG. 2, when the voltage appearing on battery bus 57 drops below a predetermined value, a load shedding signal is produced by module 73 and conducted via path 75 to SLR 76 (FIG. 3B) where it is effective to turn off light 77, thus completing a first tier of load shedding. The selected mode control signal together with battery voltage are conducted as by path 78 to SLR 79 where they may also result in the shedding (disconnection) or dimming (as described hereinafter) of light 80. To provide successive tiers of load shedding and/or dimming, the mode control signal and battery voltage are conducted as by path 81 to load shedding module 82 or dimming module 83 whence, when the battery voltage declines further to a predetermined value lower than that for activating first load shedding module 73, module(s) 82/83 are activated to provide an actuating signal via path 84 to switched logic receiver 85 to shed (disconnect) or dim light 86. For further description of the dimming operation, reference is made to the following description of FIG. 4.

Figure 4A:
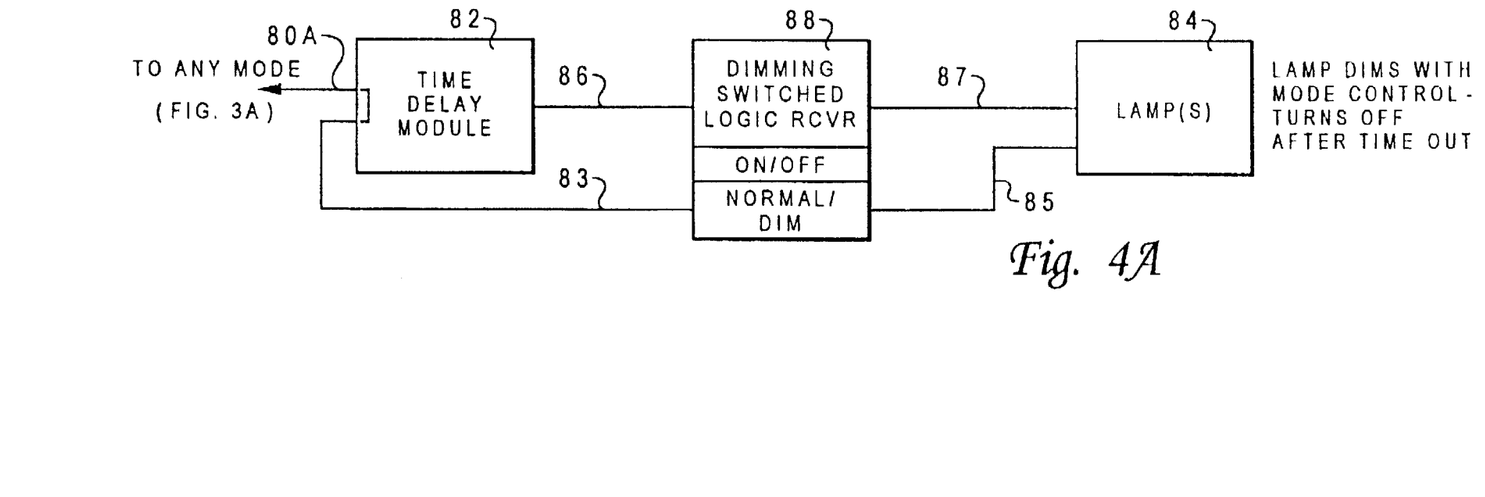
FIG. 4A illustrates a combination of a timing module and a dimming switched logic receiver according to the invention.
Figure 4B:
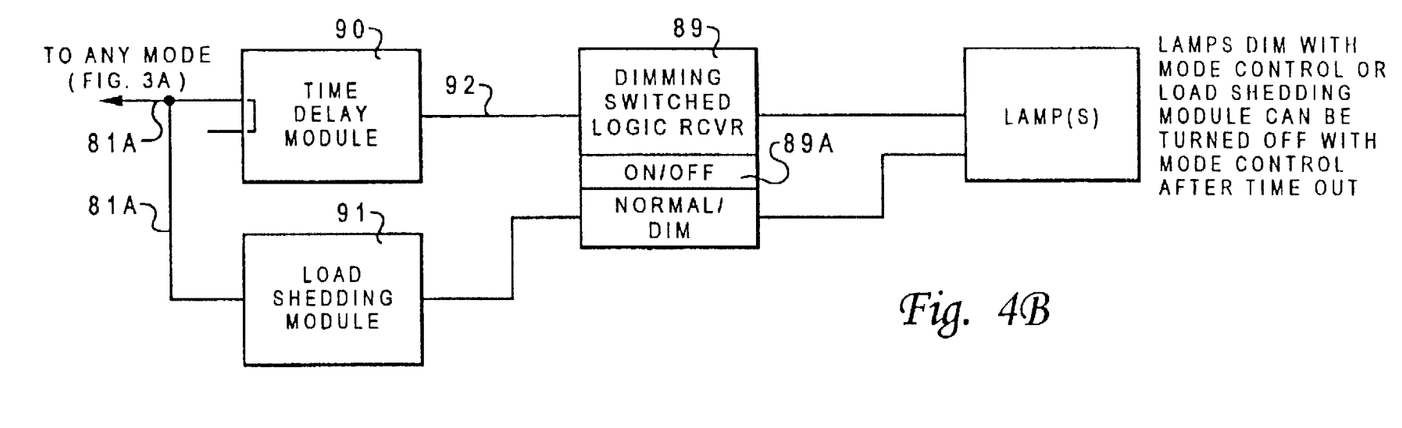
FIG. 4B illustrates a timing module in combination with a load shedding module and a dimming switched logic receiver.

Now turning to FIGS. 4A and 4B, they will be seen to depict the interaction of timing, load shedding and dimming modules. Battery voltages are conducted from bus 57, and control signals are conducted from selected connected mode representing terminals 58 of module 54 (FIG. 3) as represented by input paths 80a and 81a. In FIG. 4A, such signals enter timing module 82. There, they are effective via paths 83 and 85 to cause the connected lamp(s) 84 to dim according to the selected mode control and to turn off as the paths 86 and 87 after the timer in timing module 82 has timed out.

FIG. 4B illustrates operation such that the lamps connected to the dimming switched logic receiver 89 dim with the mode control signal and can be turned off after time-out of the timing module 90. There, it will be observed, an electrical signal representing the selected mode is received and conducted via paths 81A respectively to timing module 90 and load shedding module 91. The signal is extended from module 90 via path 92 to on-off circuits 89A of dimming switched logic module 89 so as to permit dimming but prevent complete turn off of any connected load (lights) until a predetermined time interval has expired following loss of power at the supply mains. Dimming switched logic receiver 88 is responsive to receipt of selected mode signals to reduce power to the selected loads (e.g., dim selected ones of the lights) upon receipt of the selected mode control signal and thereafter to turn off the reduced power load after timeout. Dimming switched logic receiver 89 is responsive to receipt of selected mode signals or a signal from load shedding module 91 to reduce power to the selected loads (e.g., dim selected ones of the lights) and thereafter the load may be turned off with mode control after timeout.

It will now be seen that in accordance with the principles in the preferred embodiment hereof, great versatility is achieved in that a combination of multi-tier load shedding, multi-tier load dimming and timing are provided.

Figure 5:
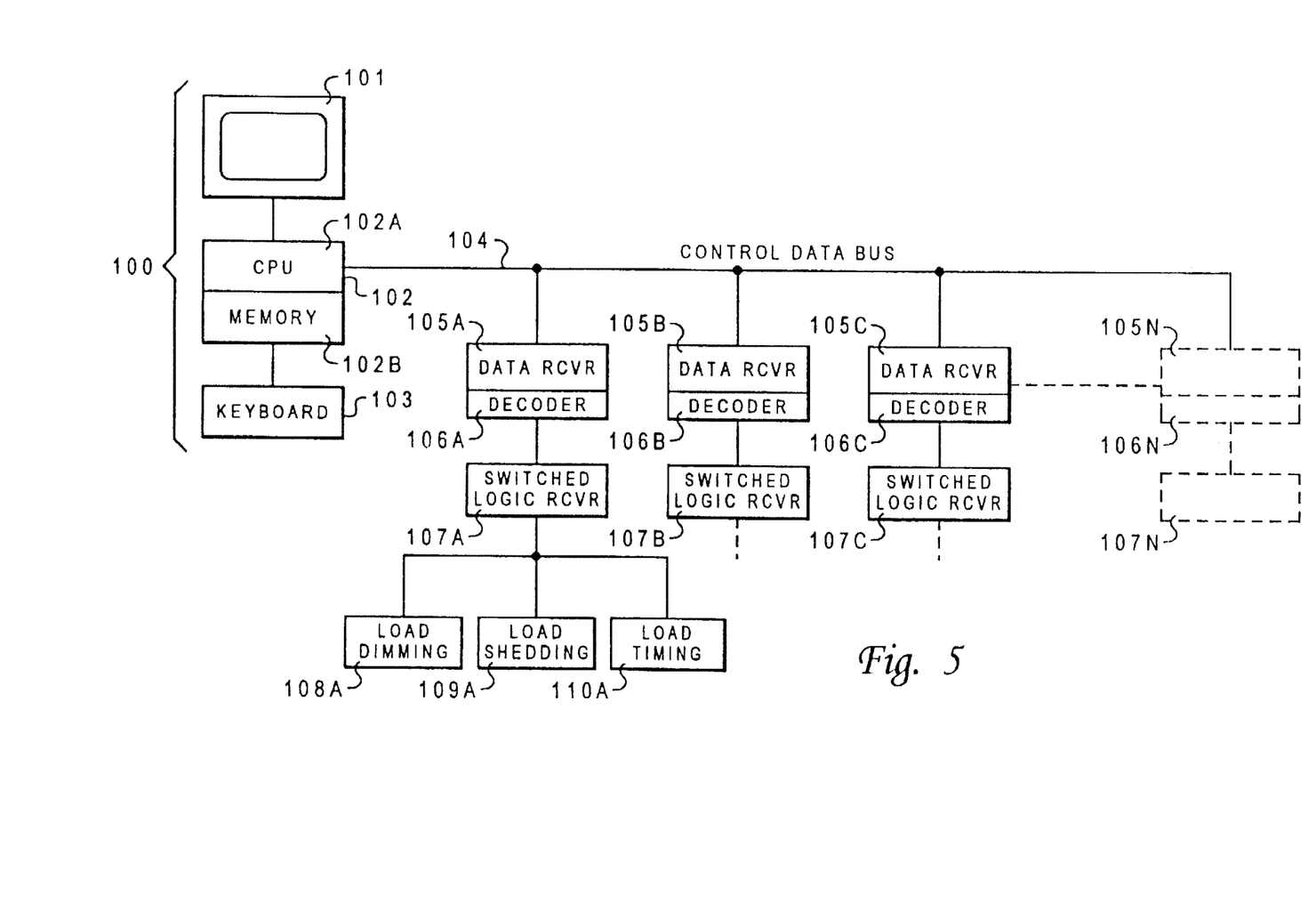
FIG. 5 illustrates a programmable lighting control system having a central control station and a plurality of remotely located switched logic receivers.

In FIG. 5, an alternate embodiment is disclosed according to which a programmable lighting control system is illustrated. This alternate embodiment includes a central control station 100 having a conventional video monitor 101, a small computer 102 having a central processing unit 102a and memory 102b such as a conventional hard or floppy disk drive. Also included are conventional keyboard 103 which is provided for data input and system control.

Connected to computer 102 is serial data and control bus on which computer 102 sequentially and repetitively extends data packets having address and command bits for providing selective addressing of the packets for one or more of the data receivers 105A-N. Preparation of a plurality of uniquely addressed data packets has heretofore been proposed, and for a more detailed description, reference is made to U.S. Pat. Nos. 4,388,567; 5,101,141 and 5,329,431.

Although in FIG. 5, only four uniquely addressable data receivers are shown in order to facilitate illustration, it should be understood that any reasonable number of such receivers could be utilized. Each data packet is received by all of the data receivers connected to control data bus 104. However, since each data packet includes bits identifying a uniquely addressed set of lights, only the correctly addressed decoder (for example, decoder 106a) recognizes the data packet that is uniquely addressed to that decoder and consequently passes the command bit information of the correctly addressed data packet to the connected switched logic receiver (in this example, receiver 107A). Accordingly, unless another packet addressed to one or more of the remaining data receivers is also sent over bus 104, only intended data decoder (in this example, decoder 106A) responds to the data packet, and only the connected operation represented by the selected one of load dimming blocks 108A, 109A and 110A is effectively instructed by the command data bits of the decoded data packet.

As will be recognized by those skilled in the arts, the load dimming, load shedding and timing modules such as those identified by the identifying symbols 108A, 109A and 110A are similar to those described and referenced elsewhere in this application, and consequently are not again described here.

Figure 6:
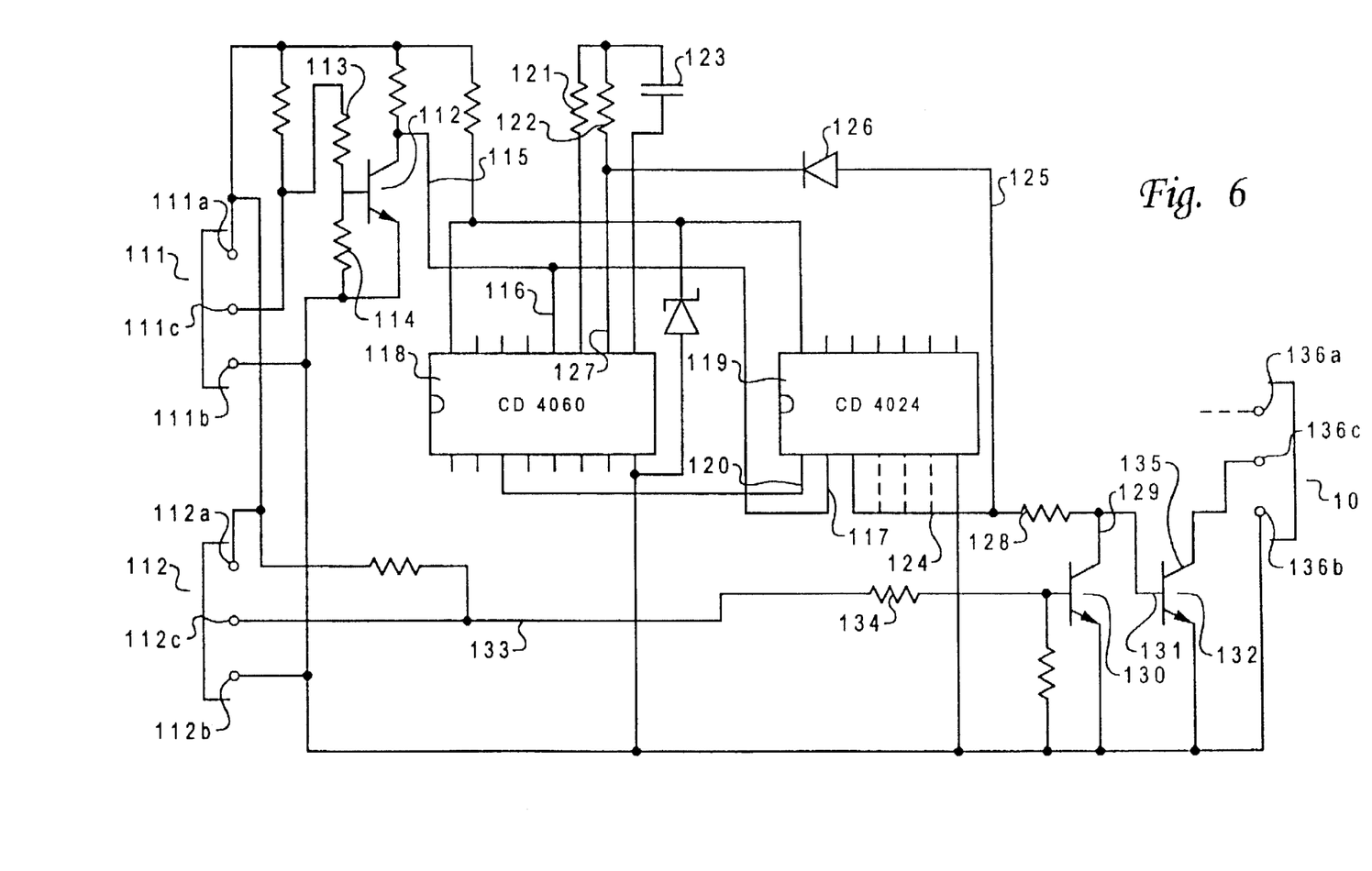
FIG. 6 is a schematic diagram of the Timing Module of FIGS. 4A and 4B.

Now turning to FIG. 6, it will be seen to disclose the schematic diagram of the preferred embodiment of the timing module to which reference is made above. As there discussed, the purpose of the timing module is to prevent turn off and/or dimming of such lights as are controlled by the timing module until a predetermined period of time has expired following a power outage. To accomplish this, the circuits of FIG. 6 are provided with two modular input groupings 111 and 112 that match the corresponding modular output terminals for Mode 3 on the aforementioned switched logic module. Thus, terminal 111c is connected to the corresponding control terminal for Mode 3, terminal 111a is interconnected to the battery bus to supply operating voltage, and 111b is interconnected to the common, or ground, connection of the battery bus.

It will be recalled that for Mode 3, the control signal goes high whenever the mains supply voltage is lost. This is communicated to the base of transistor 112 through a voltage divider network comprising resistors 113 and 114. Since transistor 112 acts to invert the signal applied to its base, when the input signal to terminal goes high (as mains power is lost), the output at its collector goes low, and such low voltage condition is extended via conductor 115 to input 116 of CMOS counters 118 and 119. These are widely available commercial products sold under the industry standard designators CD 4060 and CD 4024 respectively.

When the output of transistor 112 goes low and removes the reset signal from reset terminals 116 and 117 of the counters 118 and 119, the counters which had been held in their reset conditions by the previously applied relatively high signal, then begin their counting function, the output of oscillator/counter 118 being fed into the input 120 of counter 119.

As mentioned above, counter 118 is a type CD 4060 which contains 14 binary counting stages and two inverters that can function as an oscillator. The network comprising capacitor 123 and resistors 121 and 122 together with active components within the oscillator/counter 118 form an oscillating circuit and a counting circuit that counts oscillations produced thereby. Thus, the count contained in the counter is directly proportional to and a measure of the time that has elapsed since loss of the mains supply.

The purpose of counter 119 is to extend the effective range of counting provided by oscillator/counter 118 so as to correspondingly extend the effective time during which track of power loss can be sustained. To establish or vary the length of time from counter activation until counter 119 time-out, the oscillating frequency is correspondingly selected (or varied) so that when the desired period of time has elapsed, the counters will have counted the number of oscillations produced by the oscillator during such desired time. When this occurs, a high signal is produced by counter 119 and extended via conductors 124 and 125 through diode 126 to condition pin 127 of oscillator/counter 118 to a high state and thereby step oscillations of the aforementioned oscillator.

Another path is seen to extend via conductor 124 and resistor 128 to the collector 129 of transistor 130 and to the base 131 of transistor 132. Thus, the counter time-out signal is extended to transistors 130 and 132 to change their conditions that existed while the above-described counters were timing out to an enabling condition that occurs when such time-out is completed. This is accomplished as now described.

Referring to the lower set 112 of input terminals 112a, 112b and 112c, it should be noted that they also are of modular configuration and are adapted for modular connected to a corresponding set of terminals on the switched logic module representing the desired mode of operation. Thus, such control signal is passed from terminal 112c through conductor 133 and resistor 134 to the base of inverting transistor 130 where it normally would produce at its collector 129 an inverse signal. Such inverse signal, in the absence of overriding control by the counter circuits, would result in a corresponding signal at the collector 135 of transistor 132 and thus the control signal introduced to input terminal 112c would pass essentially transparently to output terminal 136c. Thus, if the input signal was low, the output signal also would be low; and if the input signal was high, the output signal would also be high. However, when mains power loss occurs, the signal initially occurring (before time-out) on conductor 124 is low, thus providing insufficient drive current at base 131 to drive transistor 132 to pull its output at collector 135 low, and consequently terminal 136c remains high to retain the connected lights in their lit condition irrespective of the signal at input 112c. It is only after time-out, and the signal resulting at counter output 124 goes high, that sufficient drive is imparted to the base-emitter junction of transistor 132 to turn it on and thus pass the input signal input at 112c to transparently through the above-described path to output terminal 136c. At that time, then, (i.e., at the end of timer time-out) the connected lights are controlled by the input signals and may be turned off or dimmed as the case may be.

Figure 7:
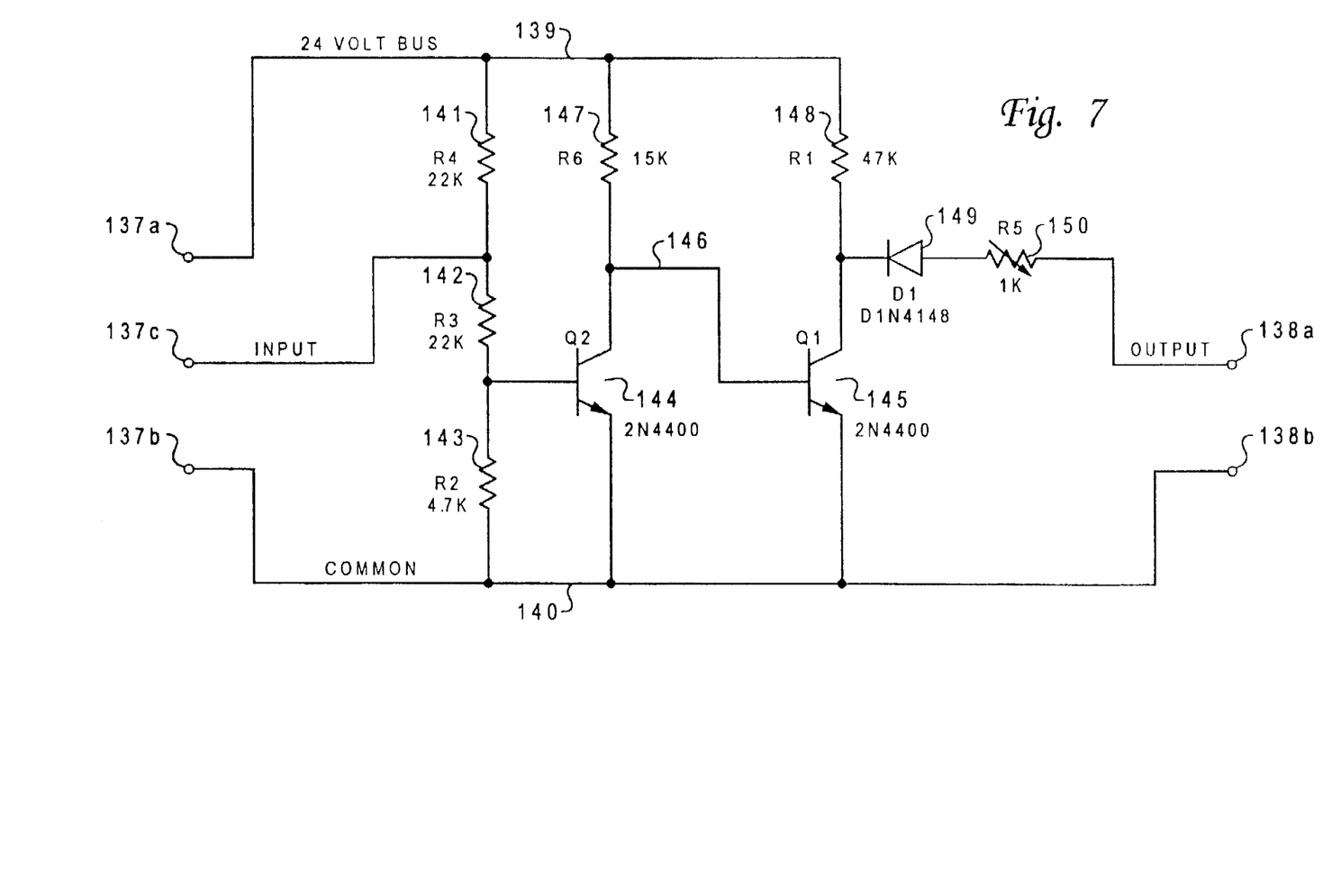
FIG. 7 is a schematic diagram of the Dimming Module of FIGS. 4A and 4B.

Reference is now made to FIG. 7 which is a schematic diagram of the Dimming Module to which reference was made during the description of FIGS. 4A and 4B. The following description is for a dimming module intended for cooperative operation with that conventional class of lights having a two-wire control input which sources a small direct current with an open circuit voltage of about ten volts, and where dimming is accomplished either by forcing a specific voltage lower than ten between the two control wires or by connecting a resistance between the two control wires. In the latter case, as the resistance is made lower, the light is progressively dimmed lower.

In the circuit of FIG. 7 there are seen the three input terminals 137a, 137b and 137c which correspond generally to input terminals 35a, 35b and 35c of FIG. 2 as well as 111a, 111b and 111c of FIG. 6. As will be recalled from the description of FIGS. 2 and 6, such input terminals are adapted for modular connection to other circuits identified hereinabove. At the right hand side of FIG. 7 are seen output terminals 138a and 138b which are provided for connection to the aforementioned conventional two wire control inputs for the light which is to be dimmed.

Connected across the positive and common conductors 139/140 is a voltage divider network comprising resistors 141, 142 and 143 which provide operating voltage for the base of transistor 144. The emitter of transistor 144 is connected to common conductor 140, and the collector is connected directly to the base of transistor 145 via path 146 and through resistor 147 to positive bus 139. The emitter of transistor 145 also is connected directly to common conductor 140, while its collector is connected through resistor 148 to bus 139 and through serially connected diode 149 and variable resistor 150 to output terminal 138a.

Operation of the circuits is as follows. When the control input voltage applied to terminal 137c is allowed to assume its open circuit voltage of approximately 12 volts, the base-emitter junction of transistor 144 is forward biased thus turning it on to pass current through resistor 147, thus dropping the voltage extended to the base of transistor 145 via path 146, thus cutting off the transistor and reducing the current flowing through resistor 148. Accordingly, the voltage drop across resistor 148 decreases so that the voltage at the collector of transistor 145 rises, and with it, the voltage applied to the cathode of diode 149, thus reverse biasing diode 149 and effectively producing at terminal 183a an open circuit voltage. However, when the input at terminal 137c is driven low to within two volts of pin 137b by the action of upstream controls, transistor 144 is effectively cut off, thus causing the voltage at the base of transistor 145 to rise to turn it on so that it conducts current through resistor 148, dropping the voltage at the cathode of diode 149 so that diode 149 conducts and correspondingly drops the voltage at output terminal 138a. This effectively introduces variable resistor 150 into the output through a path comprising resistor 150, diode 149, and the collector-emitter path through transistor 145; and thus variable resistor 150 is effectively connected across terminals 138a and 138b so that the lighting level of the connected light is dimmed to the level represented by the effective value of variable resistor 150.

It will now be evident that there has been described herein, an improved and highly versatile uninterruptible lighting system in which provision is made for extended energization of selected critical lights at either full or reduced brightness when an outage is of extended duration; and that it provides flexibility including selective light dimming and load shedding for tailoring continued lighting to the particular characteristics of the environment in which the lighting is to be installed while commensurate therewith permitting utilization of a smaller and less expensive battery.

Although the inventions hereof have been described by way of preferred embodiments, it will be evident that many adaptations and modifications may be employed without departing from the spirit and scope thereof. For example, a mix of lights of different types and ratings may be employed.

The terms and expressions employed herein have been used as terms of description and not of limitation; and thus, there is no intent of excluding equivalents, but on the contrary it is intended to cover any and all equivalents that may be employed without departing from the spirit and scope of the inventions.

What is claimed:

1. A fail-safe uninterruptible lighting system comprising:
   (a) a plurality of lights;
   (b) a principal source of power for normally energizing said lights;
   (c) a battery for supplying power for continuing to energize selected ones of said lights when said principal source of power is first interrupted;
   (d) means for establishing multi-tier priorities for retaining energization of said lights when said principal source of power is interrupted;
   (e) means for monitoring the level of charge on said battery; and
   (f) control means for ensuring energization of said selected ones of said lights from said battery according to said priorities when said principal source of power is interrupted, said control means including means responsive to reduction of said charge of said battery to predetermined successively lower discrete spaced-apart levels to correspondingly cause disconnection of less than all of said lights from said battery according to said priorities.

2. A fail-safe uninterruptible lighting system according to claim 1 in which said control means additionally includes means for selectively dimming certain ones of said lights.

3. A fail-safe uninterruptible lighting system according to claim 2 in which said control means further includes timing means effective when said principal source of power is interrupted for preventing disconnection of selected ones of said lights from said battery until a prescribed period of time has transpired following interruption of said power.

4. A fail-safe uninterruptible lighting system according to claim 2 wherein said selective dimming of said certain ones of said lights is progressive at selected intervals of battery discharge.

5. A fail-safe uninterruptible lighting system according to claim 2 wherein said control means includes timing means for preventing said selective dimming of said certain ones of said lights until after a predetermined period of time has passed following interruption of said principal source of power.

6. A fail-safe uninterruptible lighting system according to claim 1 in which said means for establishing multi-tier priorities further includes means for establishing priorities for dimming certain ones of said lights.

7. A fail-safe uninterruptible lighting system according to claim 6 in which said control means further includes timing means effective when said principal source of power is interrupted for preventing dimming of said certain ones of said lights until a prescribed period of time has transpired following interruption of said power.

8. A fail-safe uninterruptible lighting system according to claim 1 in which said selected ones of said lights are all of said lights.

9. A fail-safe uninterruptible lighting system according to claim 8 wherein said disconnection is progressive to cause disconnection of additional numbers of lights at selected intervals of battery discharge.

10. A fail-safe uninterruptible lighting system according to claim 1 in which said selected ones of said lights are less than all of said lights.

11. A fail-safe uninterruptible lighting system according to claim 10 wherein said disconnection is progressive to cause disconnection of additional numbers of lights at selected intervals of battery discharge.

12. A fail-safe uninterruptible lighting system according to claim 1 wherein said disconnection is progressive to cause disconnection of additional numbers of lights at selected intervals of battery discharge.

13. A fail-safe uninterruptible lighting system comprising:
(a) a plurality of lights;
(b) a principal source of power for normally energizing said lights;
(c) a battery for supplying power for continuing to energize selected ones of said lights when said principal source of power is first interrupted;
(d) means for establishing multi-tier priorities for retaining energization of said lights when said principal source of power is interrupted;
(e) means for monitoring the level of charge on said battery; and
(f) control means for ensuring energization of said selected ones of said lights from said battery according to said priorities when said principal source of power is interrupted, said control means including means responsive to reduction of said charge of said battery to predetermined levels to correspondingly cause disconnection of less than all of said lights from said battery according to said priorities; said control means further including timing means effective when said principal source of power is interrupted for preventing disconnection of selected ones of said lights from said battery until a prescribed period of time has transpired following interruption of said power.

14. A fail-safe uninterruptible lighting system comprising:
(a) a plurality of lights;
(b) a principal source of power for normally energizing said lights;
(c) a battery for supplying power to energize selected ones of said lights when said principal source of power is first interrupted;
(d) means for establishing multi-tier priorities for retaining energization of said lights when said principal source of power is interrupted;
(e) means for monitoring the level of charge on said battery; and
(f) control means for ensuring energization of said selected ones of said lights from said battery according to said priorities when said principal source of power is interrupted, said control means including means responsive to discharge of said battery to predetermined levels to correspondingly cause progressive disconnection of said lights from said battery according to said multi-tier priorities.

15. A fail-safe uninterruptible lighting system according to claim 14 in which said control means additionally includes means for selectively dimming certain ones of said lights.

16. A fail-safe uninterruptible lighting system according to claim 15 in which said control means further includes timing means effective when said principal source of power is interrupted for preventing disconnection of selected ones of said lights from said battery until a prescribed period of time has transpired following interruption of said power.

17. A fail-safe uninterruptible lighting system according to claim 15 in which said control means further includes timing means effective when said principal source of power is interrupted for preventing dimming of said certain ones of said lights until a prescribed period of time has transpired following interruption of said power.

18. A fail-safe uninterruptible lighting system according to claim 14 in which said control means further includes timing means effective when said principal source of power is interrupted for preventing disconnection of selected ones of said lights from said battery until a prescribed period of time has transpired following interruption of said power.

19. A fail-safe uninterruptible lighting system according to claim 14 in which said selected ones of said lights are less than all of said lights.

20. A fail-safe uninterruptible lighting system according to claim 19 wherein said means for establishing multi-tier priorities for retaining energization of said lights includes means connecting said lights into said separate groups.

21. A fail-safe uninterruptible lighting system according to claim 14 wherein said means for establishing priorities for retaining energization of said lights includes means connecting said lights into said separate groups.

22. A fail-safe uninterruptible lighting system according to claim 21 in which one of said separate groups consists of one light only.

23. A fail-safe uninterruptible lighting system according to claim 22 in which said means for establishing priorities includes means for establishing priorities by said separate groups.

24. A fail-safe uninterruptible lighting system according to claim 23 wherein at each one of said predetermined levels of battery discharge at least one of said groups is disconnected.

25. A fail-safe uninterruptible lighting system according to claim 24 wherein said control means is effective to continue energization of said group consisting of one light only from said battery until said battery is essentially discharged.

26. A fail-safe uninterruptible lighting system according to claim 23 wherein at one of said predetermined levels of battery discharge at least one of said groups is dimmed.

27. A fail-safe uninterruptible lighting system according to claim 21 in which said means for establishing multi-tier priorities includes means for establishing multi-tier priorities by said separate groups.

28. A fail-safe uninterruptible lighting system according to claim 27 wherein at each of said predetermined levels of battery discharge at least one of said groups is disconnected.

29. A fail-safe uninterruptible lighting system according to claim 25 wherein at one of said predetermined levels of battery discharge at least one of said groups is dimmed.

30. A fail-safe uninterruptible lighting system according to claim 14 wherein said means for establishing priorities for retaining energization of said lights includes means connecting said lights into separate groups.

31. A method of selectively energizing a plurality of lights from a battery during a power outage comprising:
  (a) establishing priorities of retention for said lights during said power outage;
  (b) monitoring the level of charge remaining on said battery during said power outage; and
  (c) progressively disconnecting said lights in accordance with said priorities at different discrete levels of said charge remaining on said battery.

32. The method of claim 31 further including steps of:
  (a) establishing priorities for dimming selected ones of said lights; and
  (b) dimming said selected ones of said lights according to said discrete levels of said charge remaining on said battery.

33. The method of claim 32 further including a step of timing of elapsed time following onset of said power outage.

34. The method of claim 33 further including a step of preventing dimming said selected ones of said lights until a predetermined interval of time has elapsed following said onset of said power outage.

35. The method of claim 31 further including a step of timing of elapsed time following onset of said power outage.

36. The method of claim 35 further including a step of preventing disconnection of selected ones of said lights until a predetermined interval of time has elapsed following said onset of said power outage.

37. The method of claim 31 further including a step of connecting said lights into groups, and wherein progressive disconnection of said lights in accordance with said priorities includes disconnection of said lights in groups.

38. A method of selectively energizing a plurality of lights from a battery during a power outage comprising:
  (a) establishing a sequence of retention for said lights during said power outage;
  (b) monitoring the level of charge remaining on said battery during said power outage; and
  (c) progressively disconnecting said lights in accordance with said sequence at multi-tiered discrete levels of said charge remaining on said battery.

39. The method of claim 38 further including a step of connecting said lights into groups, and wherein progressive disconnection of said lights in accordance with said sequence includes disconnection of said lights in groups.

40. The method of claim 39 further including a step of preventing disconnection of selected ones of said lights until a predetermined interval of time has elapsed following said onset of said power outage.

41. The method of claim 38 further including steps of:
  (a) establishing sequences for dimming selected ones of said lights; and
  (b) dimming said selected ones of said lights according to said discrete levels of said charge remaining on said battery.

42. The method of claim 41 further including a step of timing of elapsed time following onset of said power outage.

43. The method of claim 42 further including a step of preventing dimming said selected ones of said lights until a predetermined interval of time has elapsed following said onset of said power outage.

44. The method of claim 38 further including a step of timing of elapsed time following onset of said power outage.

45. The method of claim 44 further including a step of preventing disconnection of selected ones of said lights until a predetermined interval of time has elapsed following said onset of said power outage.

46. The method of according to claim 38 further including a step of connecting said lights into groups, and wherein progressive disconnection of said lights in accordance with said sequence includes disconnection of said lights in groups.

47. A programmable fail-safe uninterruptible lighting system comprising:
  (a) a plurality of lights;
  (b) a principal source of power for normally energizing said lights;
  (c) a battery for supplying power for continuing to energize selected ones of said lights when said principal source of power is first interrupted;
  (d) means including a central control station for establishing discrete multi-tier priorities for retaining energization of said lights when said principal source of power is interrupted;
  (e) means for monitoring the level of charge on said battery; and
  (f) control means including said central control station for severally selecting said lights in groups and for conditioning said lights for operation in groups according to said priorities when said principal source of power is interrupted, said control means including means responsive to reduction of said charge of said battery to predetermined discrete progressive spaced-apart levels to correspondingly cause progressive disconnection of less than all of said lights from said battery according to said priorities.

48. A programmable fail-safe uninterruptible lighting system according to claim 47 wherein said control means includes means for producing and transmitting to said lights signals severally identifying said lights and for severally conditioning said operation of said lights to any one of a predetermined plurality of modes.

49. A programmable fail-safe uninterruptible lighting system according to claim 48 wherein said means for producing signals for severally conditioning said operation of said lights includes means for including within said signals commands for dimming at least one of said lights.

* * * * *